United States Patent [19]

Zenner et al.

[11] 4,233,330

[45] Nov. 11, 1980

[54] CAKE PROCESS AND PRODUCT

[75] Inventors: Sylvester F. Zenner, Memphis, Tenn.; Daniel C. Stanberry, Mission Viejo, Calif.

[73] Assignee: Patent Technology, Inc., San Francisco, Calif.

[21] Appl. No.: 954,646

[22] Filed: Oct. 25, 1978

Related U.S. Application Data

[63] Continuation-in-part of Ser. No. 834,808, Sep. 19, 1977, abandoned, which is a continuation of Ser. No. 722,218, Sep. 10, 1976, abandoned.

[51] Int. Cl.³ .................... A21D 13/08; A21D 15/00
[52] U.S. Cl. ................................... 426/321; 426/553; 426/554
[58] Field of Search .................... 426/18–26, 426/551–555, 321

[56] References Cited

PUBLICATIONS

Webb et al, *Byproducts From Milk* 2nd Ed. "Lactose" 1970, Avi Pub., pp. 375–377.
Guy "Lactose-Review of Its Properties and Uses in Bakery Products" *The Baker's Digest*, Apr. 1971, pp. 34–36, 38 & 74.
Chemical Abstract vol. 78, 1973, p. 378 Item 28134f.
Chemical Abstract vol. 71, 1972, p. 313 Item 11266Tu.
Reger "New Aspects of an Old Sugar-Lactose" *Cereal Science Today*, vol. 3(10) Dec. 1958, pp. 270–272.

*Primary Examiner*—Raymond N. Jones
*Assistant Examiner*—Elizabeth A. Hatcher
*Attorney, Agent, or Firm*—Flehr, Hohbach, Test, Albritton & Herbert

[57] ABSTRACT

Cake products (yellow, white and devil's food) as produced by commercial bakers for wholesale and retail markets and characterized by significantly prolonged shelf-life are produced by replacing 10 to 35% of the sugar and fat content of standard dough formulations for such bakery products with lactose. Specifically, lactose is used to replace 10 to 35% of the sugar or corn sugar content (sucrose, dextrose) or fat content (shortening), or both, in such standard formulations containing as a norm, 24 to 32% sugar and 8 to 13% fat. Shelf-life of the improved cake products, which is related to the tenderness or "freshness" of the baked products, is prolonged 100 to 400%, or longer, as compared to the shelf-life of standard formulation cakes of the same type. Substantially increased volumes and external appearance scores are also obtained in comparison with said standard formulatin products.

6 Claims, 4 Drawing Figures

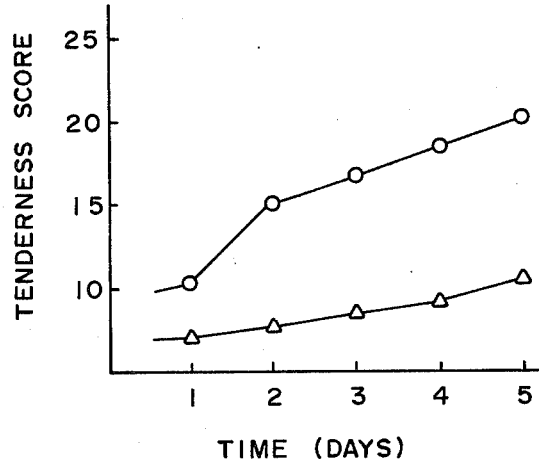
FIG.—1
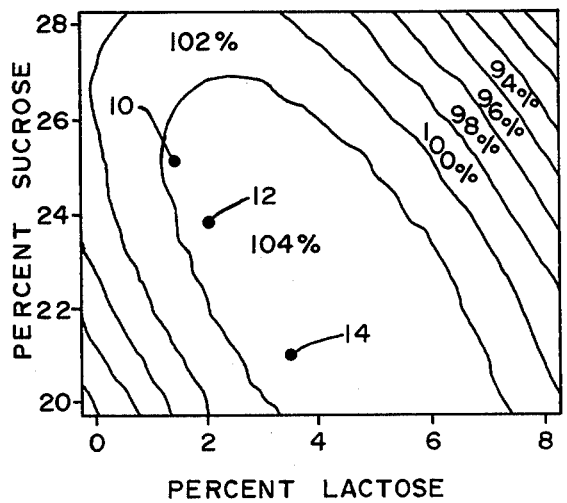
FIG.—2
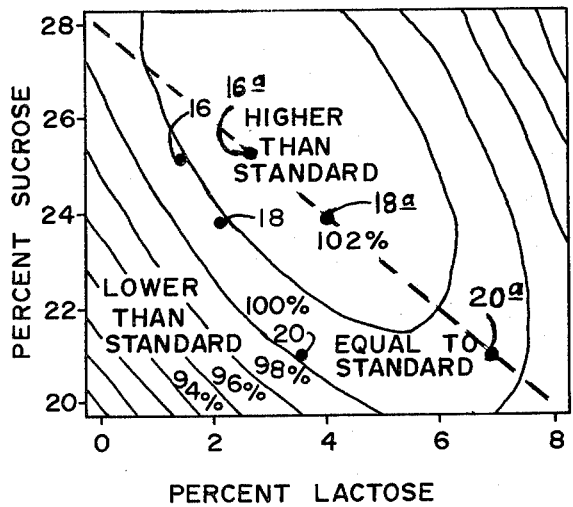
FIG.—3
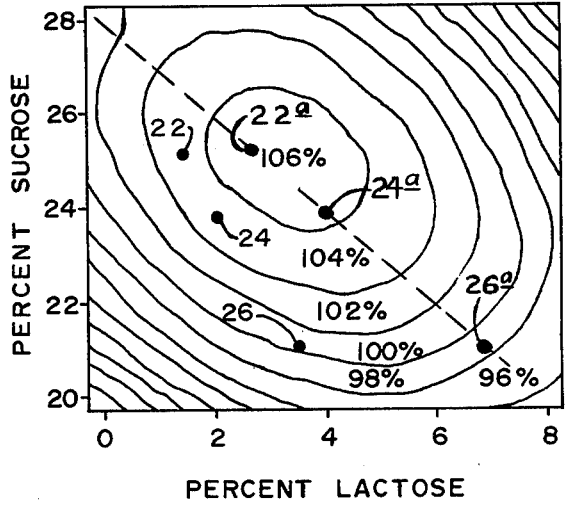
FIG.—4

CAKE PROCESS AND PRODUCT

CROSS REFERENCE TO RELATED APPLICATION

This application is a continuation-in-part of our copending application Ser. No. 834,808, filed Sept. 19, 1977, which is a continuation of our previously filed application, Ser. No. 722,218, filed Sept. 10, 1976, both now abandoned.

BACKGROUND OF THE INVENTION

This invention relates to commercial cakes as sold in bakeries, supermarkets, and like retail outlets in the United States. Such cake products include specifically the yellow cakes (wholesale and high quality), the white cakes, and dark colored cakes such as devil's food cake. Because of the formula balancing rules that have been established by the baking industry, standardized formulas for these cakes are available and are set forth in the following table:

TABLE 1
"STANDARDIZED" CAKE FORMULAS[1,2]

|  | Wholesale Yellow | High Quality Yellow | White | Devil's Food |
|---|---|---|---|---|
| Flour | 26.0% | 24.0% | 24.0% | 20.0% |
| Liquid (Water, milk, eggs) | 33.6 | 33.7 | 33.2 | 35.4 |
| Leavening (Baking powder) | 1.3 | 1.3 | 1.3 | 1.2 |
| Milk solids | 2.6 | — | — | — |
| Salt, flavor | To taste | To taste | To taste | to Taste |
| Color | — | — | — | 4.0 |
| Shortening | 8.0 | 10.0 | 11.0 | 11.1 |
| Sugar | 28.5 | 31.0 | 30.5 | 28.3 |
|  | 100.0% | 100.0% | 100.0% | 100.0% |

Authority:
[1]"The Baker's Digest", W. H. Lawson, September 1970, pages 36–38 (formulas, page 38).
[2]"Baking Science & Technology", E. J. Pyler, Vol. II, 1973, Siebel Pub. Co., Ill., pages 971-2.

While virtually every authority will preface a review of a "standard" formulation by saying that minor modifications or variations in the ingredients or proportions are to be expected (depending on the flour used, type of cakes desired and other factors), the formulations are surprisingly similar as shown by the foregoing, particularly with respect to the two key ingredients: sugar and fat. Thus, the weight proportion of sugar in the standard formuation for yellow, white or deveil's food cake is within the range from 24 to 32%, whereas the proportion of fat or shortening is within the range from 8 to 13%. These standardized proportions are to be expected in view of certain basic rules concerning the relationship of ingredients to each other (formula balance) which are still in use today. Thus, most cakes currently made by wholesale bakers have a sugar flour ratio of the order of 115:100 whereas the accepted levels for high quality white and yellow cakes range only slightly higher, at about 120–140 parts sugar to 100 parts flour. Similar relationships exist with respect to, for example, the weight of the shortening to the weight of the eggs, the weight of the liquids with respect to the weight of the sugar, and so on. The foregoing "standardized" formulas are consistent with these rules and generally reflect standards existing in the bakery trade with respect to the indicated cake products.

In these standard formulations, "sugar" is used in the usual sense of sucrose or dextrose (corn sugar) whereas the term "liquid" is intended to refer to the liquid ingredients, including water and/or milk, eggs, the water content of liquid sugars and the like. For various reasons as noted below, standardized cake formulations are not found to include lactose.

Commercial lactose, or milk sugar, is typically made by concentrating liquid whey from cheese-making to about 50% solids and then cooling to produce lactose crystals. The crystals are collected by centrifuging, washed, redissolved in water and then dried, or recrystalized to increase purity and dried. The resulting lactose is much less soluble than sucrose or dextrose, and is known to be inherently lacking in plasticity in dough formulations. Thus the use of lactose in cakes, either as a sweetener or as pure carbohydrate, has been greatly limited.

It is worthy of note that lactose does find its way into some cakes, indirectly. Thus, non-fat milk solids (50% lactose) and dried whey (75% lactose) are well known ingredients which find frequent use in certain cake mixes. However, bakers have had to overcome known volume depressing effects of these ingredients. Cereal chemists have evidence that lactose is a principal factor responsible for this volume depressing effect[3], possibly due to its low plasticity noted above. Consequently, lactose would seem to be very undesirable as a baking ingredient, particularly in standard cake formulas of the type described.

[3]. See "Use of Whey in Baking", by E. J. Guy, Proceedings of Whey Products Conference, June 14–15, 1972, U.S. Department of Agriculture.

SUMMARY OF THE INVENTION AND OBJECTS

This invention relates to commercial cakes (yellow, white, devil's food) of improved characteristics, including significantly prolonged shelf-life, and to processes for the manufacture of such products making use of lactose as a replacement for a substantial portion of the sugar and/or fat content in the cake mix.

In general, it is an object of the present invention to provide improved commerical cakes of the above character based on standard dough or cake mix formulations wherein from 10 to 35% of the sugar and/or fat content of the cake mix is replaced with lactose.

It is a particular object of the invention to utilize such lactose replacement of sugar and fat in known commercial cake mixes to obtain cake products which exhibit significantly improved tenderness and "freshness", as represented by shelf lives at least 100% and ranging to 400% longer than normally obtained with the known or standard cake mixes.

Another object of the invention is to provide commercial cake products of such character, based on substitution of lactose in the cake mix, which exhibit substantially improved quality as respects increased volume, improved external appearance, flavor and aroma.

Another object of the invention is to provide an improvement in the commercial processing of cakes in which optimum dough and product characteristics are developed in a novel manner, through lactose replacement of a substantial proportion of the sugar and fat content present in regular or "standard" cake mixes.

As a general statement, the present invention is predicated on our discovery that lactose can be used to replace 10 to 35% of the sugar content (e.g., sucrose or dextrose) and/or the fat content (e.g., shortening) in standard cake mix formulations for producing a variety of commercial cakes (including dry mix formulations), with unexpected improvements being shown in the tenderness and "freshness" of the resulting cake products, as evidenced by the previously noted significant prolongation in shelf-life —viz., ranging from 100% to 400% longer than normally encountered with cake products prepared from standard formulations for such products.

Specifically, we have found that as lactose is substituted for the sugar and/or fat content in commercial yellow, white or devil's food cake mixes, the cake products initially become less tender. However, as the lactose level is increased to within the range of the 10 to 35% substitution of the present invention, the product becomes unexpectedly more tender as reflected by tenderness scores substantially below those obtained with the standard formula cake mixes. The result is a significant and unexpected increase in the "freshness" or shelf-life of the cakes over a substantial period of time. For example, if the desired freshness level of a standard commercial cake normally lasts two to three days, the same cakes made with approximately 10 to 15% lactose substituted into the formulation will last 5 to 9 days —representing an extraordinary improvement in keeping quality. Substantial improvements in dough or batter qualities, as reflected by improved workability of the dough, and in baking qualities, as represented by significant increases in cake volumes (10 to 15%) and in internal appearance scores (5 to 15%), are also obtained. An additional benefit is flavor and aroma enhancement, apparently related to an ability of lactose to absorb flavors and aroma and color, and to retard the loss of these values during processing and baking. The foregoing improvements are unexpected, not only because of the lack of sweetness and flavor of the lactose, but also because of the inherent lack of plasticity and known volume-depressing characteristics of the lactose ingredient, which would lead a worker in the art away from substituting lactose for either the sugar or the shortening content in a standard cake formulation.

Summarizing, we have specifically found that lactose is capable of functioning as a direct replacement from 10 to 35% of the sugar or fat in standard cake mix formulations to provide product qualities which are generally more satisfactory than obtained with the standard cake mixes, and which are vastly and unexpectedly improved as respects the freshness or shelf-life and tenderness of the final baked products. Moreover, when used as a replacement for the sugar and shortening in these standard cake mixes, the separate components (sugar, shortening, and lactose) apparently cooperate with one another to provide cumulative or synergistic effects which make possible the unusual and unexpected improvements in process and product characteristics described.

Other objects and features of the invention will appear from the following description, in which preferred embodiments are set forth, and from the drawings.

BRIEF DESCRIPTION OF THE DRAWINGS

FIG. 1 is a graph illustrating a particular advantageous feature of the present invention.

FIGS. 2, 3 and 4 are computer contour maps (related to three variables), illustrating further advantageous features of the present invention.

DESCRIPTION OF THE PREFERRED EMBODIMENTS

Sugar and fats play an important role in the production of virtually every type of bakery product. As previously noted, the sugar content in certain standard commercial cakes (white, yellow and devil's food) will range from 24 to 32%, expressed as a proportion of the flour. The fat or shortening content will range from about 8 to 13%, again expressed as a proportion of the total weight of the formula. While the functions of sugar and shortening in standard cake mix formulations are generally diverse, they are well known and considered extremely important to the commercial baker.

In chemically leavened products such as cakes, sugar (sucrose) and corn sugar (dextrose) are of primary importance for sweetening and flavoring, and as tenderizers. Sucrose, as obtained from sugar cane or sugar beets is most important in providing a sweet flavor. Corn sugar, or dextrose provides a normal amount of tenderness with about a ⅓ reduction in sweetness. Various types of brown sugars are frequently used to provide unique flavor sensations. In the case of liquid sugars and syrups, the water portion will function as a moistener in the cake formula.

Shortening (fat) functions in a cake formulation to impart moist eating quality and tenderness to the final cake product. In chemically leavened products such as cakes, the plasticity imparted by the shortening also facilitates the mixing or creaming process to entrap and retain considerable quantities of air, thus insuring desired leavening effect in cakes of high sugar content.

In general, there is little reason to replace sugar or shortening in the typical cake formula. These ingredients not only are readily available from commercial sources, but are ideally suited to their intended purpose. As noted, sucrose or dextrose (individually or mixed) are the common sugars. Lard or hydrogenated shortening are the common fats.

According to the present invention, dried crystalline lactose is substituted in standard formulations for commercial cake in portions equivalent to 10 to 35% of the formula content of sugar, corn sugar and/or shortening ingredients as referred to above. In this regard, "sugar" is used in the customary dictionary sense as defining a substance consisting entirely or essentially of sucrose, as derived principally from sugar cane and sugar beets, but also from sugar maple, sorghum and like sources. "Corn sugar" is also used in the dictionary sense of identifying specifically dextrose, although the substitution of lactose for corn syrup is clearly contemplated.

The terms "fat" and "shortening" as used herein are intended to cover the various commercially available shortenings, of animal and/or vegetable origin, as used in the bakery trade. Particular types of shortenings include lard, plastic animal and vegetable shortenings, plastic emulsified animal and vegetable shortening, plastic vegetable shortening, plastic emulsified vegetable shortening, and fluid aerating shortenings, among others.

According to the present invention, the lactose is incorporated into standard cake mixes for yellow, white or devil's food cake in the manner of any dry subdivided material, such as non-fat milk solids, sugar or salt. Utility and effectiveness of the lactose substitution is indicated for such cake formulations specifying between 24 and 32% sugar and 8 to 13% shortening. The indicated lactose substitution is effective for such formulations as used in cake processing based on the old creaming method, the more recent threestage and two-stage blending methods, and in the new continuous cake mixing procedure. In general, and assuming a standard formulation of essential cake mix ingredients, including customary proportions of flour, liquid (water, milk, eggs) and leavening, and standard proportions of sugar and shortening as specified above, the improvement of the present invention comprises replacing from 10 to 35% of the weight of the sugar or shortening (or both) in the cake mix with lactose, followed by mixing or blending the ingredients including the lactose component to form a batter or dough, forming the dough into a unit (or units) for baking, and baking the same to provide cake products having the significant, unexpected characteristics as respects enhanced tenderness or "freshness" and prolonged shelf-life, as indicated herein, together with the improved characteristics as respects increased volume, external appearance, flavor and aroma.

With particular reference to formulas for the production of improved commercial cakes in accordance with the present invention, a typical generalized formulation is set forth in the following Table 2 in terms of standardized proportions of the essential ingredients (flour, liquid and leavening), and in terms of optimal ranges of sugar, fat and replacement lactose. In this table, the proportions of all ingredients are expressed as percentages of the total formula:

TABLE 2

| CAKE MIXES USING LACTOSE | |
|---|---|
| Component | Yellow, White, or Devil's Food Cake |
| Flour | 20–30% |
| Liquid | |
| (water, milk, eggs) | 33–37% |
| Leavening | |
| (Baking powder) | 0.8–1.5% |
| Salt, flavor | To taste |
| Milk solids, color | As needed |
| Sugar | 15.6–28.8% |
| Shortening | 5.2–11.7% |
| Lactose | 0.8–11.1% |
| | 100.0% |

In the foregoing general formulation, the indicated ranges of lactose, sugar and shortening are representative of a 10 to 35% substitution of lactose for the sugar and/or shortening content in the standard cake mix formulas. For example, in the above formulation, the lowest value for sugar (15.6%) represents a 35% replacement by lactose at the lower standard level of sugar (viz., sugar content reduced from 24% to 15.6%), the lactose being added at an approximate 1:1 ratio as respects the sugar. When lactose is used at its lowest level to replace only 10% of the highest sugar (viz., 32% in standard formula), the high sugar level is reduced from 32 to 28.8%. A similar explanation applies to the range for shortening. The indicated range for lactose is in accordance with the foregoing, and indicates the lactose/sucrose replacement at approximately a 1:1 ratio. As noted hereinafter, however, we have further observed the lactose will unexpectedly replace more than its own weight of substituted sugar and shortening, so that the substitution ratio of lactose for sugar in these standard formulas will generally fall within the range from 1:1 to 1:2.

As generally respects the foregoing "standard" cake formulation, it will be understood that the term "liquid" is broadly meant to include water, liquid milk, eggs, liquid sugars and syrups, and the like. In this regard, liquid milk is known to contain about 97% water, egg whites about 87% water, and egg yolks about 50% moisture, the solids content providing various desired features to the cake mix such as adding to the structure and food content of the final cake products. Herein "leavening" is likewise broadly intended to include a common chemical leavening agent such as baking powder, soda and the like. The term "flavor" is similarly intended to broadly include such ingredients as natural and artificial vanilla, natural fruits, fruit extract, spices and the many other natural and synthesized flavors which are available to the baker.

The following examples are intended to be illustrative of the practice of the present invention and also the substitution of lactose for 10 to 35% of the sugar and/or shortening content in cake mix formulations for commercial yellow, white and devil's food cakes. In these examples, all concentrations of ingredients are expressed as a percent of the total formula by weight.

EXAMPLE 1

| Dough Formula - Yellow Cake | | |
|---|---|---|
| Ingredient | Standard Formula | With Lactose Substitution |
| Cake Flour | 26.0 | 26.0 |
| Liquid | 33.6 | 33.6 |
| Water | | |
| Liquid eggs (whole) | | |
| Nonfat dry milk | 2.6 | 2.6 |
| Salt, flavor | To taste | To taste |
| Baking Powder | 1.3 | 1.3 |
| Sugar (sucrose) | 28.5 | 18.5–25.6 |
| Shortening | 8.0 | 5.2–7.2 |
| Lactose | — | 0.8–10.0 |
| | 100.0% | 100.0% |

Procedure—Standard

1. Dry blend flour, sugar, shortening, baking powder, salt, and nonfat dry milk.
2. Mix the eggs with half of the water.
3. Add half of the egg/water mixture to dry blended cake mix, and mix for 3 minutes at low speed.
4. Add remainder of egg/water mixture and mix ½ minute at low speed and 3 minutes at medium speed.
5. Add the balance of the water to the preceding cake mix and mix for three minutes at low speed. Pour aliquot portion of cake batter (380 grams) into 8-inch lines cake pan and bake for 26 minutes at 375° F.

Procedure—With Lactose Substitution

The procedure is the same except that lactose is substituted for the sugar and/or shortening content of the standard cake mix formula within the indicated range of proportions, to provide three variables for purposes of evaluation (i.e., the levels of lactose, sucrose and shortening). The final baked cakes are evaluated with respect to conventional standards (e.g., tenderness and shelf life, volume and external appearance) for comparison with the cakes made by the standard procedure.

Results (a) Shelf Life: Within the indicated range of lactose substitutions, cake tenderness scores are recorded over a five day period with respect to a selected lactose substituted cake formula, in comparison with cake prepared by the standard cake mix formula of Example 1 (above), using the standard baker's compressimeter technique. Specific data and an analysis of the results are presented in the following Example 2, in conjunction with FIG. 1.

(b) Volume and External Appearance: Comparative volumes and external appearance scores are recorded for a series of yellow cakes using lactose substitutions within the indicated ranges above, in comparison with yellow cakes prepared by the standard cake mix formula of Example 1, using the rape seed and American Institute of Baking (A.I.B.) procedures, and the results presented by the response surface methodology (R.S.M.) technique. According to this technique, the results are in the form of computer contour maps (i.e., the data is analyzed by computer and a model system generated and presented as contour lines). The data are presented in the following Examples 3-8 for three separate lactose-substituted yellow cake mixes, in conjunction with the contour maps of FIGS. 2 through 4.

EXAMPLE 2

"Freshness" and Shelf Life

A series of yellow cakes are prepared according to the standard cake mix formula of Example 1, using 28% sucrose and 9% shortening in the formula. Yellow cakes are also prepared according to the process of the present invention, employing 24% sucrose, 4% lactose, and 6% shortening, representing an approximate 15% reduction in sucrose and a 33% reduction in shortening. Compressimeter values as to cake tenderness are recorded over a five day period, as a measure of shelf life or "freshness". These values are plotted in FIG. 1 with tenderness (compressimeter) scores being plotted on the vertical axis and time (in days) on the horizontal axis.

Results

FIG. 1 shows that at one day the tenderness score (7%) for the lactose subsituted cake is approximately ⅓ less than the score (10.5) for the standard formula cake. At five days, the value for the lactose-substituted cake is equal to the score for the standard mix cake at one day, representing a shelf life prolongation of 400%. Similar results are indicated for the lactose-substituted cakes at intervening time periods. Thus at each of two, three and four days, the tenderness value for the lactose-substituted cake is substantially less than the value for the standard formula cake at one day, representing a prolongation of shelf life or "freshness" within the range of at least 100% and ranging up to 400%.

EXAMPLES 3-5

Volume/External Appearance-No Reduction in Shortening

Yellow cakes are prepared using the standard cake mix formulation and procedure of Example 1, with 28% sucrose and 9% shortening. Lactose substitutions for sucrose are made at a 1:2 ratio according to the following table.

TABLE 3

| Examples - Lactose Substitution For Sucrose Only | | | | | |
|---|---|---|---|---|---|
| Example | % Substitution of Sugar | % Substitution of Fat | Actual Sugar | Actual Fat | Actual Lactose |
| 3 | 10 | 0 | 25.2 | 9.0 | 1.4 |

TABLE 3-continued

| Examples - Lactose Substitution For Sucrose Only | | | | | |
|---|---|---|---|---|---|
| Example | % Substitution of Sugar | % Substitution of Fat | Actual Sugar | Actual Fat | Actual Lactose |
| 4 | 15% | 0 | 23.8 | 9.0 | 2.1 |
| 5 | 25% | 0 | 21.0 | 9.0 | 3.5 |

The foregoing table represents 10, 15 and 25% substitutions of lactose for sucrose at the 1:2 ratio, with the shortening being held at the normal 9% level. The resulting baked cakes are evaluated by the rape seed displacement and American Institute of Baking techniques as respects volume and external appearance, and also for flavor and aroma.

Results

Cake volumes are presented in the computer contour map of FIG. 2. Cake corresponding to Example 3 is found at point 10 on the map, and exhibits a volume which is substantially greater than for the standard formula cake mix (approximately a 4% increase). External appearance scores for the Example 2 cake are also substantially improved.

Example 4 cake is found at point 12 on the contour map of FIG. 2, and shows the volume to be substantially greater than that of cake prepared from the standard cake mix (4% increase). External appearance scores are also very substantially improved as respects the standard formula cakes.

The lactose-substituted cake of Example 5 is found at point 14 on FIG. 2. The volume is again shown to be very substantially greater than for the standard formula cake (4% increase). External appearance scores are also improved, and better than the Example 3 cakes. Thus, the cakes of Examples 3 and 5 (representing 10, 15 and 25% lactose replacements, respectively) all exhibit volume characteristics which are superior to those of the standard formula cakes, together with substantially improved external appearance characteristics as respects the standard formula cakes.

By way of explanation, the contour map of FIG. 2 shows cake volume responses at various levels of substitution of lactose for sucrose, with shortening being held constant at the level in the standard formula. The far upper left hand corner of the figure thus represents cake volume of cake made with the standard mix. The contour map shows that as lactose is substituted for the sucrose, the cake volume increases, as represented by each of the cakes of Examples 3, 4 and 5. FIG. 2 particularly shows that as sucrose is reduced and lactose increased, optimum results are obtained over a broad response area centralized within the central oval of the map, at a lactose to sucrose ratio below 1:1. It is noted that the relationship is not a 1:1 replacement of sugar with lactose, but is closer to a 1:2 replacement ratio. However, reducing sucrose too much (as represented by the lower left hand corner of the contour map of FIG. 2) causes volume depression. Likewise adding excessive lactose (as represented by the upper right portions of the contour map) will result in depressing or reducing the cake volume. Noteworthy also is the volume depressing effect of adding lactose to the cake mix formula without reducing sucrose. Cake volume depression of this character has been previously observed by some researchers, and the contour maps may show why the positive effect of lactose substitution for sucrose was not observed.

Summarizing, FIG. 2 shows that improved cakes result from replacing 10–25% of the sucrose in standard cake mix formulations with somewhat less than its weight in lactose. In addition, the lactose-substituted cakes all exhibit improved characteristics as respects enhancement of flavor, aroma and color. In this regard, lactose is known as an excellent adsorbant and has been used as a carrier for flavors, aromas and/or color in other applications. In the lactose-substituted cakes of the present application, this function of lactose can be used to accentuate and maintain flavor, color and aroma and to retard their loss during processing and baking.

EXAMPLES 6-8

Loaf Volume/External Appearance-Fat Reduced 33%

Yellow cakes are again prepared using the standard cake mix formulation and procedure of Example 1, with 28% sucrose and only 6% shortening. Lactose substitutions for sucrose are made at a 1:2 ratio according to the following table.

TABLE 4

| Example | % Substitution of Sugar | % Substitution of Fat | Actual Sugar | Actual Fat | Actual Lactose |
|---|---|---|---|---|---|
| 6 | 10 | 33 | 25.2 | 6.0 | 1.4 |
| 7 | 15 | 33 | 23.8 | 6.0 | 2.1 |
| 8 | 25 | 33 | 21.0 | 6.0 | 3.5 |

Examples 6, 7, and 8 represent 10, 15 and 25% substitutions of lactose for sucrose and fat, respectively, with the shortening being held at two-thirds the normal level at 6%. The final cakes are evaluated by the rape seed displacement and American Institute of Baking techniques for volume and external appearance, and also for flavor and aroma.

The computer contour map of FIG. 3 is generally similar to that of FIG. 2, except for a shift of the pattern upwardly and to the left. However, the response of increasing volumes at varying lactose substitutions remains relatively unchanged, even though the lactose is substituted for both the sucrose and the shortening. Thus the cakes corresponding to Examples 6, 7, and 8, found at points 16, 18 and 20 on FIG. 3, have volumes equal or superior to the standard formula cakes, based on a lactose for sucrose substutition ratio of 1:2. At substitution ratios close to 1:1 (suggested by dotted line and points 16a, 18a, and 20a, in FIG. 3), volumes close to peak or optimum values are obtained.

In general, FIG. 3 shows that lactose is substituted for sucrose (at substitution ratios between 1:2 and 1:1 and at substitution levels above 10%), cake volumes increase. Such increase in volume continues with lactose substitution until approximately a 25% substitution level is reached, as represented by points 20 and 20a in FIG. 3. In general, the computer map of FIG. 3 shows that lactose can be successfully substituted for about 10–35% of the sugar and fat content of standard cake mix formulas (the shortening content being reduced by one third), with optimum results being obtained when approximately 10 to 15% of the sucrose is replaced by somewhat less than its weight of lactose.

The computer map of FIG. 4 relates to external appearance scores of the cakes of Examples 6, 7, and 8 (plotted at points 22, 24 and 26, respectively, in FIG. 4). In general, FIG. 4 shows that the scores for external appearance are significantly improved for the lactose-substituted cakes, even when the shortening level is reduced by one third. Highest scores are observed at this reduced level of shortening when about 10 to 15% of the sucrose is replaced with approximately an equal weight of lactose, (viz., 1:1 lactose for sucrose ratio), such relationship being suggested by the dotted line and points 22a and 25a in FIG. 4. In this regard, the scores for external appearance are in line with and confirm the general indications of improvement of product quality obtained by means of lactose replacement of sucrose and shortening in cake mix formulas.

EXAMPLE 9

| Ingredient | Dough Formula - White Cake | |
|---|---|---|
| | Standard Formula | With Lactose Substitution |
| Cake Flour | 24.0 | 24.0 |
| Liquid | | |
| Water (⅞) | 22.2 | 22.2 |
| Eggs (⅛) | 11.0 | 11.0 |
| Salt, flavor | To taste | To taste |
| Baking Powder | 1.3 | 1.3 |
| Sugar | 30.5 | 20–27.5 |
| Shortening | 11.0 | 7.1–10.0 |
| Lactose | — | 0.7–9.6 |

Procedure—Standard

The mixing and baking procedure for the standard cake mix is essentially as described in Example 1.

Procedure—Lactose Substitution

In the case of the lactose substitution, lactose is substituted for the sugar and shortening content of the mix within the indicated range of proportions, at lactose for sucrose ratios of between 1:2 and 1:1. The resulting cakes are evaluated with respect to conventional quality standards, as to tenderness and shelf life, cake volume and external appearance, and the qualities and characteristics of the lactose substituted cakes compared with those of the cakes prepared according to the standard formulation.

Results

The volume and external appearance scores are similar to those obtained with the yellow cakes, in that the values based on a 10 to 35% substitution of lactose for sugar and shortening, at all lactose to sucrose substitution ratios, are at least equivalent to those obtained with the standard cake mix formula, and with substantially improved scores being indicated at the optimum level of 10 to 15% replacement of the sucrose with lactose. Best results are obtained at approximately a 1:1 substitution ratio of lactose for shortening and sugar, with equal shortening or with a ⅓ reduction in the shortening level. Significantly, very marked improvements in tenderness scores reflected as observable "freshness" or shelf-life of the cakes, are obtained. On the average, shelf-life extensions for the lactose substituted white cakes are of the order of at least 100% and ranging up to 400%, as related to cakes prepared with the standard formula cake mixes.

| Dough Formula - Devil's Food Cake | | |
|---|---|---|
| Ingredient | Standard Formula | With Lactose Substitution |
| Cake Flour | 20.0 | 20.0 |
| Liquid | | |
|   Water (⅞) | 23.8 | 23.8 |
|   Eggs (⅛) | 7.6 | 7.6 |
| Cocoa | 4.0 | 4.0 |
| Salt, flavor | To Taste | To Taste |
| Leavening | | |
|   Baking powder | 0.9 | 0.9 |
|   Soda | 0.4 | 0.4 |
| Sugar | 28.3 | 18.5-25.5 |
| Shortening | 11.1 | 7.2-10.0 |
| Lactose | — | 0.7-9.0 |

Procedure

The mixing and baking procedure with respect to the standard cake mix is substantially the same as in Example 1.

Procedure—Lactose Substitution

The procedure for the lactose-substituted cake mix is the same except that lactose is substituted for the sugar and shortening content of the batter, within the indicated range of proportions. The resulting baked cakes are evaluated with respect to conventional quality standards, e.g., tenderness and shelf-life, cake volume, external appearance, and the lactose-substituted cakes compared with the cakes prepared by the standard mix formulations.

Results

The results obtained with the lactose-substituted devil's food cake mixes are substantially the same as those obtained with the yellow and white cake products. In general, values obtained within a 10-35% substitution of lactose for sugar and shortening are equivalent to those obtained with the standard cake mix formulas, and are appreciably better when an optimum level of about 10 to 15% replacemet of the sucrose with lactose is employed, at a 1:1 replacement ratio, and at either equal or with ⅓ reduction in the shortening level. The marked improvement in "freshness" or shelf-life, in terms of shelf-life prolongations of the order of at least 100% and ranging up to 400%, is again observed with the lactosesubstituted devil's food cake mixes.

What is claimed is:

1. In a process for preserving the freshness of standard yellow, white or devil's food cakes for prolonged periods of time while simultaneously maintaining and improving volume, appearance and other desired characteristics of said cake products, said process employing standard formulations of essential cake mix ingredients including flour, water, leavening, and 24 to 32% sugar and 8 to 13% shortening on the weight of the flour, the improvement comprising the steps of employing lactose as a replacement for 10 to 35% by weight of the sugar content and 10 to 35% by weight of the shortening content in said standard cake mix formulations, thereafter mixing the formula ingredients including said replacement lactose to form a batter, forming the batter into at least one unit for baking, and baking said unit to provide a cake product which exhibits desired characteristics of "freshness" for periods of time at least 100% and ranging up to 400% longer than yellow, white and devil's food cakes prepared with said standard formulation mixes without said replacement lactose, and which also exhibit substantially increased volumes and improved external appearance scores as compared to said standard formulation cakes.

2. A process as in claim 1 wherein corn sugar forms part of the sugar content of said standard formulation and said lactose replaces at least 10 to 35% of said corn sugar.

3. A process as in claim 1 wherein said lactose replaces 10 to 35% of the sugar and shortening in a standard cake mix formulation for yellow cake.

4. A process as in claim 1 wherein said lactose replaces 10 to 35% of the sugar and shortening in a standard cake mix formulation for white cake.

5. A process as in claim 1 wherein said lactose replaces 10 to 35% of the sugar and shortening in a standard cake mix formulation for devil's food cake.

6. A cake composition produced by the process of claim 1.

* * * * *